Aug. 12, 1969  E. BLANK  3,461,363
LOW-INDUCTANCE CAPACITOR
Filed May 10, 1968  3 Sheets-Sheet 2
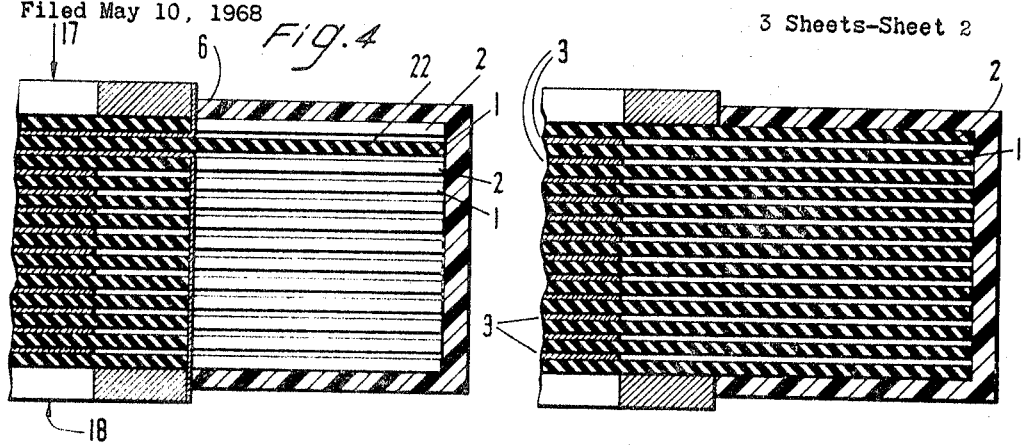
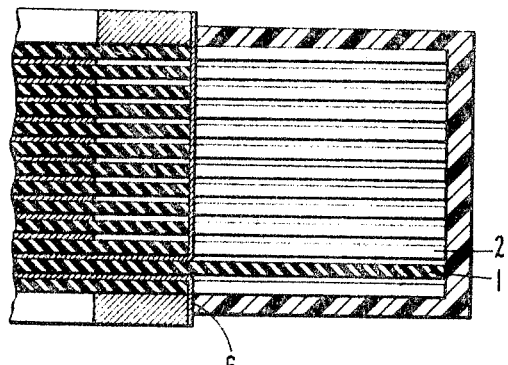
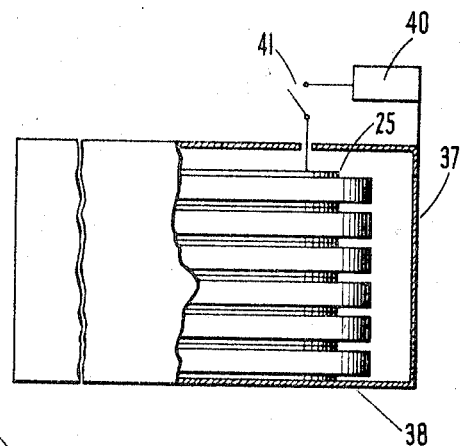
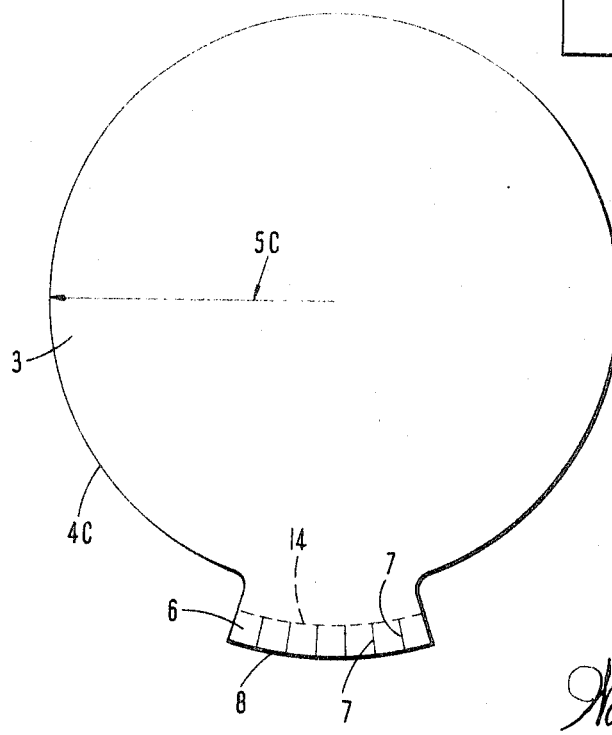
INVENTOR
Edward Blank
BY
Wolf, Greenfield & Hieken Aug. 12, 1969  E. BLANK  3,461,363
LOW-INDUCTANCE CAPACITOR
Filed May 10, 1968  3 Sheets-Sheet 3
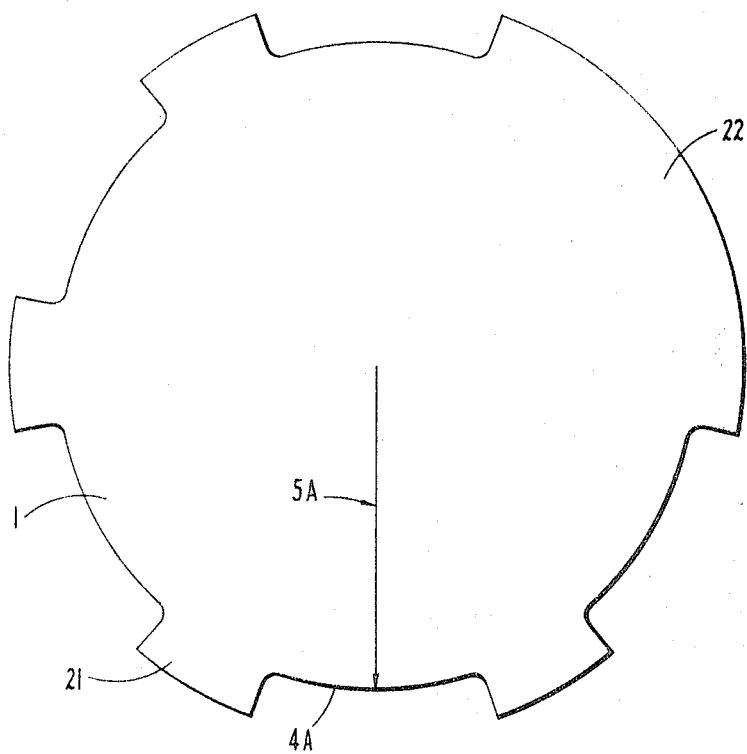
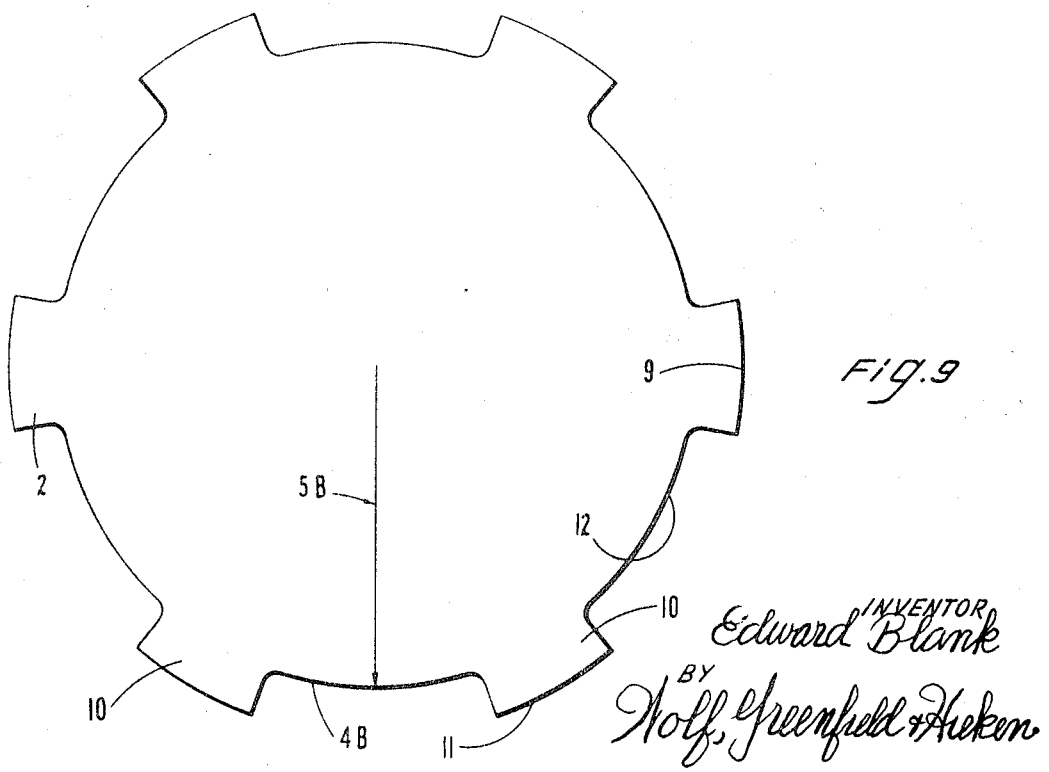
INVENTOR
Edward Blank
BY
Wolf, Greenfield & Hieken

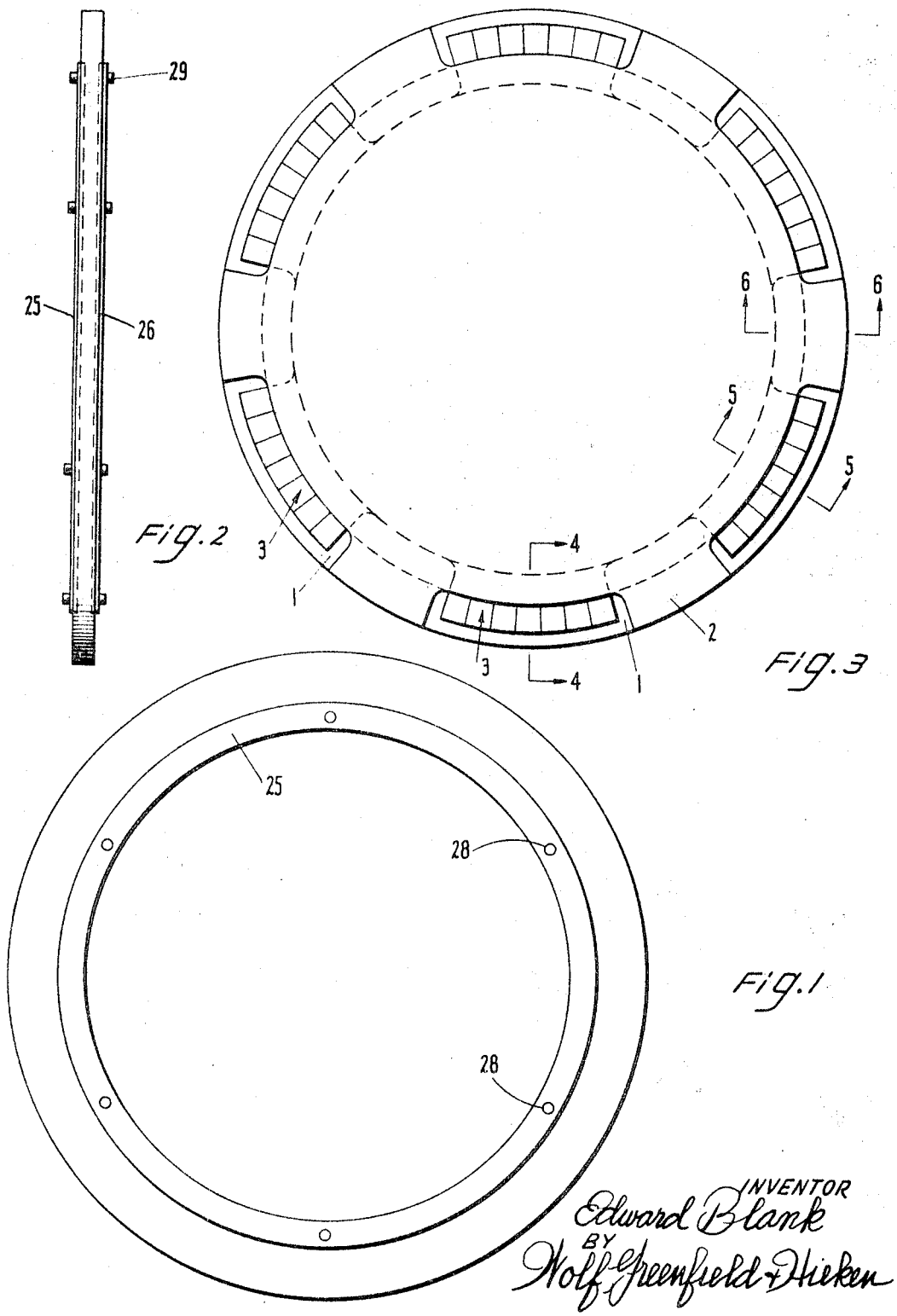

United States Patent Office 3,461,363
Patented Aug. 12, 1969

3,461,363
LOW-INDUCTANCE CAPACITOR
Edward Blank, Sharon, Mass., assignor to Tobe Deutschmann Laboratories, Inc., Canton, Mass., a corporation of Massachusetts
Filed May 10, 1968, Ser. No. 728,181
Int. Cl. H01g 1/02
U.S. Cl. 317—261                                 6 Claims

ABSTRACT OF THE DISCLOSURE

A low inductance capacitor stack formed essentially as a coaxial line from a plurality of individual series connected flat capacitors having opposed series connected ring terminals on opposed faces with a cylindrical conductor coaxial with the individual capacitors forming the return path. The individual capacitors are formed of alternating, conductive and dielectric sheets with the conductive sheets arranged in pairs and having conductive tabs projecting from the outer periphery with each tab of each pair connected to a different ring and with the tabs of adjacent pairs rotationally staggered.

Background of the invention

The present invention relates to a high voltage capacitor and, more particularly, to the type of high voltage capacitor used for energy storage and/or fast discharge where lowest inductance possible is desired.

Capacitors have previously been used as energy storage devices in which it is desired to extract the maximum amount of energy in the shortest possible time. Existing capacitors, especially when used in stacks of at least two capacitors, have limited utility for such purpose because of the inherent inductance of the capacitor itself and because of the inherent inductance of a stack of capacitors which inductances limit the peak power available and the maximum rate of discharge possible. In prior art, capacitors such as shown in my United States Letters Patent No. 3,346,790, low inductance is attained in individual capacitors. However, even using capacitors of the design exemplified in that patent wherein very low inductances are attained, one encounters limitations that are introduced by the inductance of a stack of such capacitors.

It is, therefore, an object of the present invention to provide a capacitor which may be utilized in a stack of series connected capacitors without adding inductance that is large in relation to the self-inductance of the individual capacitor. A further object of the present invention is to provide a capacitor design having the advantages of the capacitor design described in my Patent No. 3,346,790 and, in addition, incorporates a design which permits use of capacitors in series with a lower total inductance than attained in a stack of capacitors of the type described in that patent. A further object of the present invention is to provide a stack of capacitors having terminal arrangements shaped and positioned so as to permit a lower inductance without an increase in dimensions with respect to other capacitors of equal energy value.

Summary of the invention

In the present invention there is provided a means and method of connecting capacitors in a stacked series without adding inductances to the capacitors that is large in relation to the self-inductance of the capacitors themselves. In the present invention, there is provided a design for energy-storage capacitors or light-source capacitors having substantial versatility and use. When used in a stack of like capacitors the present invention provides a capacitor package having an extremely low inductance capable of delivering significant bursts of energy in very short periods of time.

In a preferred embodiment of the invention, there is provided a low inductance capacitor formed of a plurality of alternating dielectric and metallic sheets with each having a periphery defining the sheets. The metallic sheets are each provided with a projecting tab extending from the periphery. The metallic sheets are positioned in parallel aligned relation with pairs of the sheets having their tabs coextensive, and with the pairs of coextensive tabs longitudinally aligned in a stepped relationship extending radially from the longitudinal axis of the alternating sheets. The dielectric sheets are each provided with tab means dielectrically isolating the metallic sheet tabs one from the other, with the outer surfaces exposed for terminal connections. In the preferred embodiment, a stack of like capacitors having opposed ring-shaped terminals on opposite faces are stacked in series and are connected to a load through a switch with a return path to the series connected capacitors provided by an annular conductive sleeve coaxial with the stack of capacitors.

Brief description of the drawings

The foregoing objects and advantages of the present invention will be more clearly understood when considered in conjunction with the accompanying drawings, in which:

FIG. 1 is a plan view of a capacitor embodying a preferred form of the invention;

FIG. 2 is an edge view of the capacitor shown in FIG. 1;

FIG. 3 is a plan assembly view with various components shown in partially assembled relationship in full and dotted outline;

FIG. 4 is a cross-sectional detail of a fully assembled capacitor taken along a line which corresponds with the line 4—4 of FIG. 3 when the capacitor is in finished form;

FIG. 5 is a cross-sectional detail of a fully assembled capacitor taken along a line which corresponds with the line 5—5 of FIG. 3 when the capacitor is in finished form;

FIG. 6 is a cross-sectional detail of a fully assembled capacitor taken along a line which corresponds with the line 6—6 of FIG. 3 when the capacitor is in finished form;

FIG. 7 is a plan view of a conductive sheet which forms some of the components of a preferred form of the invention;

FIG. 8 is a plan view of one of the dielectric sheets or components used in the preferred embodiment;

FIG. 9 is another of the dielectric sheets or components used in the preferred embodiment of the invention; and FIG. 10 is a partially fragmented and cross-sectional elevation of a stack of capacitors embodying the present invention with a load and connecting switch shown schematically.

Description of the preferred embodiment

The capacitor of the present invention is intended to function as a low-inductance capacitor capable of providing substantial power with the capacitor capable of being designed to handle a variety of power and voltage parameters. The capacitor is built up from a plurality of alternate dielectric and conductive sheets. The dielectric sheets may comprise any thermoplastic mica or paper material having good dielectric quality. The conductive sheets may comprise any metal material adapted to be formed of in very thin sheet form but preferably is made of metal such as aluminum or copper foil. The metal should have a low resistance in order to attain the best possible high Q characteristics for the capacitor. It is also desirable that the foil be relatively thin. However, it should not be thinner than twice the depth of penetration at the resonant frequency of the circuit.

The capacitor is built up of a plurality of alternate dielectric sheets or plates 1 and 2 (FIGS. 8 and 9), and conductive sheets or plates 3 (FIG. 7). In the specific embodiment illustrated, the invention will be described in conjunction with the capacitor having six pairs of such conductive sheets selectively connected to two terminals by twelve tabs or taps with each of the tabs integral with a separate conductive sheet. It should be understood, however, that this invention may be embodied in other forms wherein two terminals are connected to any desired number of conductive sheets or plates. The number of conductive sheets and tabs to be used may be determined by known capacitor technology.

The conductive sheets 3 and dielectric sheets 12 are respectively illustrated as having circular peripheries 4C, A and B, with respective radii 5C, B and A. Radii 5A and 5B preferably are equal and in the preferred embodiment is 4¾". Radius 5C is less than radii 5A and 5B and in the preferred embodiment is 4¼". Other geometric configurations may, however, be used and include for example a configuration which is rectangular or square in shape. However, for convenience in manufacture and assembly, a circular shape is deemed preferable.

In this arrangement, each conductive sheet 3 is provided with a radially extending tab 6, integrally formed with the sheet and preferably of the same thickness as the main portion of the sheet. The tab may vary in arcuate length and depth, depending upon the specific construction desired. However, in the particular embodiment illustrated, the tab 6 has an arcuate length of 35 degrees. The depth of the tab may vary depending upon the specific construction utilized but, again, in the preferred embodiment illustrated, a conductive sheet having a radius of 4¼", and a tab having a depth of 1" is provided. Tabs are formed with slots or cuts 7, preferably spaced 5 degrees apart and extending inwardly from the outward edge 8, a depth of approximately ½" or to a point 4¾" from the center. These cuts are provided to permit ease in folding tabs outwardly against the peripheries 4A and 4B of adjacent dielectrics for connection to the terminals in a manner hereafter described.

The conductive sheets 3 in the preferred embodiment are arranged in sets of six pairs. Each pair of conductive sheets 3 is parallely spaced with the tabs 6 of each radially aligned. Adjacent pairs are spaced apart by one or more of the dielectric sheets 2. These dielectric sheets 2 have dielectric properties which may be determined by the particular parameters of the capacitor being constructed. More or less dielectric sheets 2 may be used depending upon the particular voltage ratings desired. The dielectric sheets 2 are provided with six projecting tabs 10 of equal geometric size and configuration. Preferably, these tabs 10 have an arcuate length of approximately 40 degrees and a depth from their outer edge 11 to the periphery 4B of ¾".

The conductive sheets 3 are arranged with their tabs 6 radially aligned and arcuately coextensive with spaces 12 between adjacent tabs 10. The tabs 6 of each conductive sheet 3 are folded along a line 14 so that the end of the tabs extend normally to the major portion of the sheet 3 with the tabs 6 extending between tabs 10 of the dielectric sheets 2. The slots or cuts 7 allow for overlap and ease in folding the tabs 6. As illustrated in FIG. 4, the ends of tabs 6 lie parallel to the axis of the capacitor with half of the tabs extending towards one end 17 of the capacitor and the other half of the tabs 6 extending toward the other end 18 of the capacitor.

The sheets 3 are arranged in pairs with the sheets 3 within a pair separated one from the other by a dielectric sheet 1. These sheets 1 are each provided with a series of tabs 21 that extend radially from the periphery 4A a distance equal to the distance of tabs 11. Preferably, the tabs 21 are geometrically shaped and sized, and are radially spaced to conform and align with the tabs 10 of the other dielectric sheets 2. However, the sheet 1 is provided with only four tabs 21 or two less than the number of tabs 10. In addition to tabs 21, dielectric sheet 1 is provided with a wide tab 22. Wide tab 22 has an arcuate length equal to the arcuate distance between the outer side edges of two adjacent tabs 21. Tab 22 has a depth or outer periphery equal to the depth or outer periphery of tabs 21. Within each pair the conductive tabs 6 are radially aligned and arcuately coextensive with the dielectric tab 22 of the interposed dielectric sheet 1. Each tab 22 and its aligned tabs 6 are radially staggered in axial alignment with the spaces 12. Tabs 22 have their outermost edges aligned with the outer side edges of adjacent tabs 10 with which they are in axial alignment.

The pairs of conductive sheets 3 with dielectric sheets 2 interposed between pairs are axially aligned. The aligned, conductive tabs 3 of one pair are arcuately staggered or stepped in rotational relation to the next axial adjacent pair or pairs.

The one conductive tab 6 of each pair closest to one end 17 of the capacitor are folded toward that end 17 over the periperies of the stacked, dielectric sheets 1 and 2, and are suitably connected together to terminal 25. Similarly, the one conductive tab 6 of each pair closest to the end 18 of the capacitor are folded toward that end and are connected to the terminal 26. The terminals 25 and 26 are each formed of a conductive ring preferably of aluminum or the like. The ring has an outer periphery which is preferably equal to the radius 5B. These rings are preferably formed with a series of holes 28 equally arcuately spaced about the ring and adapted to receive locking pins 29 which interlock the adjacent rings in series as illustrated in FIG. 10. The individual capacitors, as illustrated in FIGS. 1 and 2, have a dielectric casing or ring 31, extending about the periphery and radially outwardly from one terminal ring 25 to the other terminal ring 26.

In this arrangement, a series of several hundred capacitors of the type illustrated in FIGS. 1 and 2, may be interlocked by the pins 29 to form a capacitor having a general configuration of a coaxial line. In this arrangement, a return conductor which may be maintained at ground potential, comprises a cylindrical member 37 formed of a conductive material such as aluminum or copper. This conductive member may be connected by an inwardly extending flange 38 to the lowermost terminal ring 26 of the lowermost capacitor. The upper edge of this return path or conductor 37 may be suitably connected to a load 40 which in turn is connected to the uppermost terminal ring 25 of the uppermost capacitor through a switch 41, as illustrated in FIG. 10. The space between the conductor 37 of the capacitors may be suitably insulated by appropriate liquid- or gas-insulating mechanisms.

What is claimed is:

1. A low inductance capacitor comprising a plurality of alternating dielectric and metallic sheets,
    said metallic sheets each having a periphery with a radially oriented tab extending outwardly therefrom,
    said dielectric sheets each also having a periphery with a radially oriented tab extending outwardly therefrom,
    said metallic sheets parallely arranged in radially staggered pairs with the tabs of each pair aligned with one another and successive pairs of tabs radially staggered in spaced relation,
    said dielectric sheets arranged with one intermediate each pair of metallic sheets,
    and with said dielectric tabs interposed between said tabs of said pairs of parallel metallic sheets.

2. A low inductance capacitor as set forth in claim 1 having a pair of annular metallic terminals positioned at opposite ends of said capacitor,
    means conductively connecting the tab of one of each of said metallic sheet pairs to one of said terminals and the other of said metallic sheet pairs to the other of said terminals.

3. A low inductance capacitor as set forth in claim 1 wherein the end of the tab of one of each of said metallic sheet pairs is folded over the periphery of at least one dielectric sheet toward one end of said capacitor, and the end of the tab of the other of each of said metallic sheet pairs is folded over the periphery of at least one dielectric sheet toward the other end of said capacitor, and separate terminal means for each end of said capacitor electrically interconnecting the tabs extending to said ends to form capacitor terminals adapted to be maintained at different electrical potentials.

4. A low inductance capacitor as set forth in claim 3 wherein the dielectric sheets intermediate said sheets forming each pair have a tab which extends arcuately to the outer side edges of adjacent tabs of the dielectric sheets between which said tabs of said metallic sheets are folded.

5. A low inductance capacitor array formed of a plurality of capacitors as set forth in claim 2 wherein said capacitors are stacked in electrical series with one capacitor having one of its terminals connected electrically to an adjacent terminal of an adjacent capacitor.

6. A low inductance capacitor array as set forth in claim 5 having a conductive return path comprising a cylindrical conductive member enclosing said stacked array and connected at one end of one of said terminals.

References Cited
UNITED STATES PATENTS 3,346,790   10/1967   Blank _____ 317—242 X E. A. GOLDBERG, Primary Examiner U.S. Cl. X.R.

317—242